United States Patent [19]

McWilliam et al.

[11] Patent Number: 4,613,318
[45] Date of Patent: Sep. 23, 1986

[54] DRIVE SYSTEM WITH WEAR COMPENSATOR

[75] Inventors: Richard D. McWilliam, West Lorne; Andrew G. Anderson, London; Donald A. McCharles, Blenheim; Donald J. McLaren, Oakville; Kwang Yew, Chatham, all of Canada

[73] Assignee: Canadian Fram Limited, Chatham, Canada

[21] Appl. No.: 771,338

[22] Filed: Aug. 30, 1985

[51] Int. Cl.⁴ .............................................. F16H 9/00
[52] U.S. Cl. ...................................................... 474/74
[58] Field of Search .................................... 474/72, 74

[56] References Cited

U.S. PATENT DOCUMENTS

| | | | |
|---|---|---|---|
| 2,959,070 | 11/1960 | Flinn | 74/664 |
| 3,851,546 | 12/1984 | Kepple et al. | 74/785 |
| 4,265,135 | 5/1981 | Smirl | 74/336 |
| 4,304,150 | 12/1981 | Lupo et al. | 474/74 X |
| 4,534,458 | 8/1985 | Ladin | 192/98 |

*Primary Examiner*—James A. Leppink
*Assistant Examiner*—Frank Mc Kenzie
*Attorney, Agent, or Firm*—Markell Seitzman; Russel C. Wells

[57] ABSTRACT

A drive system (10) for rotating a plurality of engine mounted accessories comprising an input member (16) supporting a crank unit (12) and a remotely positioned auxiliary drive unit (14). The units include a plurality of output pulleys (22, 30, 90, 98) linked by drive belts (100, 102). The crank unit (12) comprises an axially movable clutch (38) and an electric responsive actuator (50, 66, 68, 72) for moving the clutch between engaged and disengaged conditions, including means for compensating for the wear of the internal components of the drive unit to affect repeatable engagement intervals.

13 Claims, 2 Drawing Figures

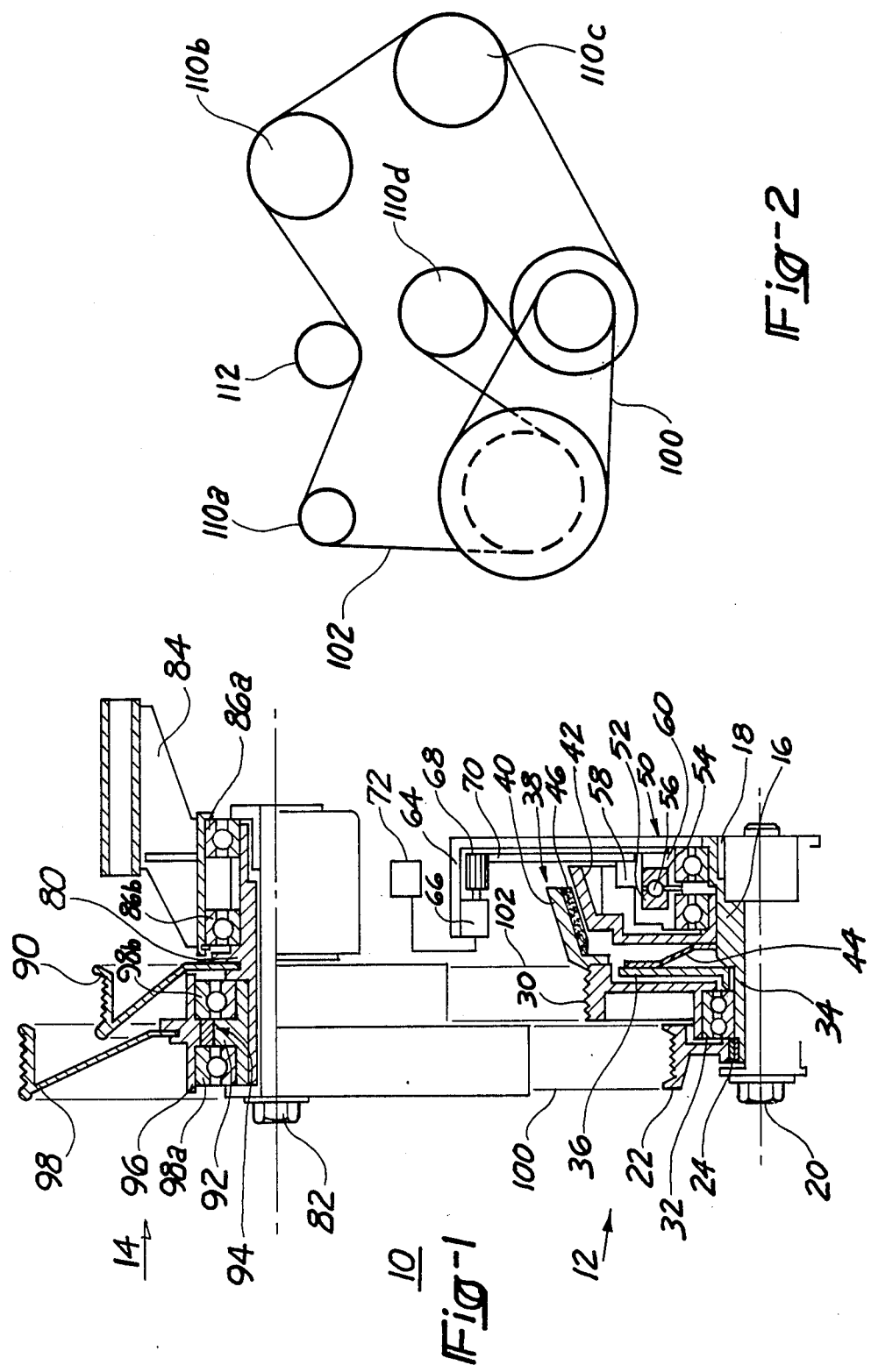

DRIVE SYSTEM WITH WEAR COMPENSATOR

BACKGROUND AND SUMMARY OF THE INVENTION

This invention relates to a two-speed accessory drive mechanism which is capable of rotating engine driven accessories at either of two predetermined speeds. More particularly, the invention relates to a drive which includes wear compensating means such that the response time during subsequent activations of the drive remains relatively constant regardless of the periodic wearing of the components of the drive.

It is well known that engine driven accessories generate a parasitic drag upon the engine, thereby reducing its over-all efficiency. A two-speed accessory drive permits the optimum utilization of these accessories by selectively operating them at one of two predetermined speeds which are selected as a function of engine speed. Operating the accessories in this manner increases their longevity and reduces the parasitic drag upon the engine. One form of accessory drive incorporates within a single, crankshaft driven unit, a clutching device which often uses a planetary gear set which, upon selective activation, operates the accessories attached thereto through a belt at either of the two operating speed. Such gear units produce an audible whine and are relatively lengthy in order to accommodate the internal gearing mechanisms.

It is an object of the present invention to provide a drive or drive system characterized by smooth, quiet engagement in response to gear-motor activation. A further object of the present invention is to provide such a system utilizing a one way roller clutch wherein the overrunning speed of the clutch is decreased in comparison to the overrunning speed of prior devices. An additional object of the present invention is to provide a system having a wear compensation means, thereby providing repeatable engagement time to activate the system.

The present invention comprises a drive system comprising an input member, an output member, and friction clutch means movable in a first direction to cause engagement and in an opposite or second direction to cause disengagement of the input and the output members. The system further includes means isolated from the input member, responsive to control signals for moving the clutch means in the first and second directions; and control means for generating a first control signal to cause the clutch means to move in the first direction, thereby engaging the output member to the input member and including wear compensation means for generating a second control signal to cause the clutch means to move in the second direction by a fixed amount, thereby disengaging from the output member.

Many of the features, purposes and objects of the invention will be clear from the detailed description of the drawings.

BRIEF DESCRIPTION OF THE DRAWINGS

In the drawings:

FIG. 1 illustrates a cross-sectional view of the major components of the invention.

FIG. 2 illustrates a plan view illustrating the invention in its operative environment.

DETAILED DESCRIPTION OF THE DRAWINGS

With reference to the accompanying drawings, there is illustrated a drive system 10 comprising a crank unit 12 and an auxillary drive unit 14. The crank unit 12 is mounted directly to the automobile crankshaft by means of an input shaft 16. The input shaft rotates with the crankshaft by means of a key 18. The crank unit 12 is further secured to the crankshaft by bolts 20 or similar fastening means. A first pulley 22 is attached to one end of the input shaft 16 through another key 24. A second pulley 30 is rotationally supported relative to the input shaft by a bearing 32. Also attached to and rotatable with the input shaft 16 through another key 34 is a drive member generally designated as 36. The crank unit 12 further includes a clutch generally designated as 38. In the preferred embodiment of the invention, the clutch 38 comprises a cone clutch which includes a first annular member or female cone 40 attached to and rotatable with the second pulley 30. An axially movable second member, pressure plate or male cone 42 is slidably mounted relative to the input shaft 16. A bushing (not shown) may be fitted between the pressure plate 42 and the input shaft to aid the axial motion thereof.

Attached to the drive member 36 and the pressure plate 42 are a plurality of leaf springs 44 (only one of which is shown in FIG. 1). The leaf springs 44 transmit the driving rotational motion of the drive member 36 to the pressure plate 42 and further urge the pressure plate away from a band of friction material 46 supported by the annular member 40.

The crank unit 12 further includes a linear actuator generally designated as 50. In the preferred embodiment of the invention, the linear actuator 50 comprises a ball ramp actuator comprising a first ramp 52 and a second ramp 54. The ramps 52 and 54 are separated by a plurality of ball bearings 56. The ramps 52 and 54 are secured within the crank unit 12 by a like plurality of ramp supports 58 and 60, respectively. One of the ramp supports, such as ramp support 60, is attached to a non-rotating portion of the engine through a bracket 64. Suspended from the bracket 64 is an electrically responsive gear motor 66 drivingly connected to a pinion gear 68 which in turn is in mating engagement with a toothed member 70, which may be viewed as an extension of the other ramp support 58. The gear motor 66 is controlled by an electronic unit 72 as described below. In response to control signals generated by the electronic unit 72, the gear motor 66 rotates the member 70 which causes the ramp support 58 to move the pressure plate 42 axially to the left or right, as viewed in FIG. 1, thereby engaging or disengaging the input shaft 16 to or from the output or second pulley 30. For reasons described below, the diameter of the second pulley 30 is preferably greater than the diameter of the first pulley 22.

The auxiliary drive unit 14 is mounted remotely from the crankshaft by a jackshaft 80. The jackshaft is supported by a bracket 84 relative to the engine by a plurality of bearings 86a and b. A third pulley 90 is rigidly attached to and rotates with the jackshaft 80. Connected directly to the jackshaft 80 is the inner race 92 of a one way roller clutch, generally designated as 94. The outer race 96 of the one way roller clutch 94 is supported relative to the jackshaft by bearings 98a and b. Attached to the outer race 96 is a fourth pulley 98. In this manner, the inner race 92 always rotates at the same speed as the jackshaft 80 or third pulley 90, and the outer race 96 always rotates at the speed of the fourth pulley 98. Interconnecting pulleys 22 and 98 is a first drive belt 100, and interconnecting the pulleys 30 and 90 is a second belt 102. The second belt 102 further interconnects the crank unit 12 and auxillary drive unit 14 to the engine mounted accessories generally designated as 110a–d as shown in FIG. 2. An idler pulley or tensioner 112 may be utilized to maintain adequate belt tension.

The system operates in either of two operational modes. The first mode is a high-speed mode wherein the accessories are rotated at a high speed. The second mode is referred to as a low-speed mode wherein the speed of the accessories is reduced. During the high-speed mode of operation, the electronic unit 72 commands the motor 66 and pinion gear 68 to rotate member 70. This action rotates the ramp support 58 and ramp 52 and urges the pressure plate 42 into engagement with the friction material 46. While the pressure plate 42 is in engagement with the friction material, the motor 66 runs in a stalled position to maintain constant axial load upon the first annular member or female portion 40 of the cone clutch 38 thereby causing the pulley 30 to rotate at the speed of the input shaft 16. During either of the two operational modes of the system, the smaller pulley 22 similarly rotates at the speed of the input shaft 16. The rotation of the pulleys 30 and 22 are communicated to the pulleys 90 and 98 through the belts 102 and 100, respectively. Further, during the high speed mode of operation, the pulley 30 is the driving force which rotates the accessories attached by means of the belt 102. The speed of the accessories are, of course, dependent upon the diameter of the pulley 30. To accomplish this driving situation requires that the pulley 90 rotate faster than the pulley 98. In other words, the inner race 92 of the roller clutch 94 must rotate faster than the outer race 96. If these rotational speed restrictions are met, then the roller clutch 94 will overrun, thereby not locking up and driving the jackshaft 80. This may be accomplished by selectively choosing the diameters of the various pulleys within the system. As an example, the diameter of pulley 22 must be less than the diameter of pulley 30. In addition, the diameter of pulley 90 must be less than the diameter of pulley 98 and, further, a diameter of pulley 30 must be greater than or equal to the diameter of pulley 90.

During the low speed mode of operation, the electronic unit 72, motor 66 and gear 68 cooperate to rotate the ball ramp support 58 in a reverse direction, thereby disengaging the pressure plate 42 from the friction material 46. The springs 44 assist in the disengagement of the pressure plate 42 from the friction material 46 by applying a separating spring force between the driving member and pressure plate. Once the cone clutch 38 is disengaged, the pulley 30 is initially driven by the inertia of the accessories at a progressively decreasing speed. The pulley 22, which is still driven at the speed of the input shaft 16, continues to rotate the pulley 98. When the speed of the pulley 90 has decreased sufficiently such that it is equal to or less than the speed of the pulley 98, the one way clutch 94 locks up, thereby permitting it to directly drive the jackshaft 80. Thereafter, pulleys 90 and 30 are driven at the reduced speed defined by pulley 98 and pulley 22 to rotate the accessories linked thereto by the belt 102.

The consistency of operation of the drive 10 is of primary importance over its useful life. During the life of the drive 10, the friction material 46 will wear and the springs 44 may lose their resiliency. In order to compensate for the wear of the members and to provide for a consistent and repeatable actuation time, the present invention incorporates therein a wear compensating scheme or means. During each successive disengagement of the clutch 38 under control of the electronic member 72, the pressure plate 42 is moved away from the friction material by a fixed amount, thereby insuring repeatable operation during successive engagements. This may be accomplished by causing the motor 66 to rotate in the reverse direction by a constant amount. Such means for accomplishing this result are to cause the electronic unit 72 to issue a control signal of fixed duration to a constant speed motor, such as motor 66, thereby causing the pressure plate 42 to move by a predetermined amount away from the friction material 46. Alternatively, a series of control pulses may be transmitted to the motor 66 causing a similar result.

It can be seen from the above that the main advantages of the present system are that the utilization of a cone clutch and ball ramp configuration provides for a quiet, smooth engagement in response to gear motor activation. Further, by positioning the one way roller clutch 94 on the jackshaft 80 allows the overrunning speed of the one way clutch to be decreased in comparison to the overrunning speed of prior devices. By decreasing the overrunning speed, the system can run at higher engine rpm's without overheating and failing. This feature allows the one way clutch to run in a packed grease environment, as compared to the traditional method of utilizing circulating oil. Further, by mounting the one way clutch to the remotely positioned jackshaft 80, the one way clutch 94 is isolated from engine torsional motions through the rubber drive belt 100, thereby increasing its useful life. In this system, the one-way clutch 94 carries total accessory torque; however the driving pulley 22 for this low speed mode only carries a fraction due to the pulley size reduction. This reduced torque requirement is obtained by the arrangement and selection of the size of the drive pulleys. As related above, the diameter of pulley 98 is greater than the diameter of pulley 22. In a related sense, a further advantage of the present invention is that the design of the preferred embodiment permits a wider range of drive ratios, since the size of pulley 22 can be chosen to be rather small.

Many changes and modifications in the above-described embodiment of the invention can, of course, be carried out without departing from the scope thereof. Accordingly, that scope is intended to be limited only by the scope of the appended claims.

We claim:

1. A drive system comprising:
   an input member;
   an output member;
   friction clutch means movable in a first direction to cause engagement and in an opposite or second direction to cause disengagement of said input and said output members;
   means isolated from said input member, responsive to control signals for moving said clutch means in said first and said second directions; and
   control means for generating a first control signal to cause said clutch means to move in said first direction thereby engaging said output member to said input member and including wear compensation means for generating a second control signal to cause said clutch means to move in said second direction by a fixed amount thereby disengaging from said output member.

2. The drive as defined in claim 1 wherein said moving means comprises a linear actuator.

3. The drive as defined in claim 2 wherein said linear actuator comprises a ball ramp actuator comprising first and second ramps.

4. The drive as defined in claim 3 wherein said moving means further includes a gear motor responsive to said control signals and adapted to rotate one of said ramps, thereby urging same to move axially in said first and said second directions.

5. The drive as defined in claim 4 wherein said second control signal causes said gear motor to rotate in a reverse direction urging said one ramp to move a predetermined axially amount in said second direction to disengage said output member.

6. The drive as defined in claim 5 wherein said gear motor is a constant speed motor and wherein said second control signal is a constant voltage for rotating said gear motor for a predetermined time in said reverse direction.

7. The drive system for driving a plurality of engine mounted accessories at either of two predetermined speed ratios comprising:
a crank unit;
a remotely situated auxillary drive unit adapted to be attached to the engine;
means, including first and second drive belts, interconnecting said crank unit and said auxilliary drive unit for transferring torque therebetween;
said crank unit comprising:
an input shaft adapted to be driven by the engine;
a first pulley directly drive by said input shaft;
a second pulley or output member rotationally isolated from said input shaft;
a drive member directly driven by said input shaft;
a pressure plate axially, slidably mounted relative to said input shaft and movable in a first direction and in an opposite second direction;
clutch means supported by said second pulley and said pressure plate movable to an engaged or clutched mode of operation and to a disengaged or declutched mode of operation in response to the movement of said pressure plate;
coupling means interconnecting said drive member and said pressure plate for coupling the rotational motion of said drive member to said pressure plate and for biasing said drive member and said pressure plate apart to urge said clutch means towards disengagement;
means isolated from said input shaft, for moving said pressure plate in said first and second directions; and
control means for generating a first control signal to cause said clutch means to move in said first direction thereby engaging said output member to said input shaft and including wear compensation means for generating a second control signal to cause said clutch means to move in said second direction by a fixed amount thereby disengaging from said output member,
said auxillary drive unit comprising:
a rotatable jackshaft remotely mounted from said input shaft;
a third pulley rotatable with said jackshaft and linked to said second pulley by said first drive belt;
a one-way clutch, including an inner race attached to and rotatable with said jackshaft and an outer race, said one-way clutch capable of directly rotating said jackshaft during instances when said other race is rotated faster than said inner race; and
a fourth pulley support by and rotatable with said outer race, and drivingly connected to said first pulley by said second drive belt.

8. The drive system as defined in claim 7 wherein the diameter of said first pulley is less than the diameter of said second pulley, the diameter of said third pulley is less than the diameter of said fourth pulley and the diameter of said second pulley is greater than or equal to the diameter of said third pulley.

9. The drive as defined in claim 8 wherein said moving means comprises a linear actuator.

10. The drive as defined in claim 9 wherein said linear actuator comprises a ball ramp actuator comprising first and second ramps.

11. The drive as defined in claim 10 wherein said moving means further includes a gear motor responsive to said control signals and adapted to rotate one of said ramps, thereby urging same to move axially in said first and said second directions.

12. The drive as defined in claim 11 wherein said second control signal causes said gear motor to rotate in a reverse direction urging said one ramp to move a predetermined axially amount in said second direction to disengage said output member.

13. The drive as defined in claim 12 wherein said gear motor is a constant speed motor and wherein said second control signal is a constant voltage for rotating said gear motor for a predetermined time in said reverse direction.

* * * * *